(12) United States Patent
Kwon et al.

(10) Patent No.: US 9,168,845 B2
(45) Date of Patent: Oct. 27, 2015

(54) METHOD OF CONTROLLING OPERATION MODE OF FUEL CELL IN FUEL CELL VEHICLE

(71) Applicant: Hyundai Motor Company, Seoul (KR)

(72) Inventors: Sang Uk Kwon, Gyeonggi-do (KR); Soon Il Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 13/968,863

(22) Filed: Aug. 16, 2013

(65) Prior Publication Data

US 2014/0336855 A1 Nov. 13, 2014

(30) Foreign Application Priority Data

May 7, 2013 (KR) .................. 10-2013-0051002

(51) Int. Cl.
| | |
|---|---|
| B60L 11/18 | (2006.01) |
| B60L 1/00 | (2006.01) |
| B60L 3/00 | (2006.01) |
| B60L 7/14 | (2006.01) |
| B60L 8/00 | (2006.01) |
| B60L 15/20 | (2006.01) |

(52) U.S. Cl.
CPC .............. *B60L 11/1885* (2013.01); *B60L 1/003* (2013.01); *B60L 3/0053* (2013.01); *B60L 7/14* (2013.01); *B60L 8/003* (2013.01); *B60L 11/1803* (2013.01); *B60L 11/1816* (2013.01); *B60L 11/1861* (2013.01); *B60L 11/1868* (2013.01); *B60L 11/1887* (2013.01); *B60L 15/20* (2013.01); *B60L 15/2009* (2013.01); *B60L 2200/10* (2013.01); *B60L 2200/18* (2013.01); *B60L 2200/32* (2013.01); *B60L 2200/36* (2013.01); *B60L 2210/10* (2013.01); *B60L 2240/12* (2013.01); *B60L 2240/423* (2013.01); *B60L 2240/80* (2013.01); *Y02T 10/7044* (2013.01); *Y02T 10/7241* (2013.01)

(58) Field of Classification Search
CPC ............ B60L 11/1881; B60L 11/1884; B60L 11/1887
USPC ................. 701/22; 180/65.31; 429/9, 428
See application file for complete search history.

(56) References Cited

U.S. PATENT DOCUMENTS

| | | | |
|---|---|---|---|
| 6,255,008 B1 * | 7/2001 | Iwase | 429/9 |
| 6,775,601 B2 * | 8/2004 | MacBain | 701/22 |

(Continued)

FOREIGN PATENT DOCUMENTS

| | | |
|---|---|---|
| JP | H11-185785 A | 7/1999 |
| JP | 2001-231108 A | 8/2001 |

(Continued)

*Primary Examiner* — Thomas G Black
*Assistant Examiner* — Sara Nelson
(74) *Attorney, Agent, or Firm* — Mintz Levin Cohn Ferris Glovsky and Popeo, P.C.; Peter F. Corless

(57) ABSTRACT

Disclosed is a method of controlling an operation mode of a fuel cell in a fuel cell vehicle wherein, (a) when a driver-demanded torque is lower than a first torque, and a current state of charge (SOC) in a battery is higher than a first SOC, the operation mode of the fuel cell is converted to a stop mode, and (b) when the driver-demanded torque is higher than a second torque, or the current SOC in the battery is lower than a second SOC, the operation mode is converted to a start mode, wherein the second torque is higher than the first torque and the second SOC is lower than the first SOC.

9 Claims, 4 Drawing Sheets

(56) References Cited

U.S. PATENT DOCUMENTS

| | | | |
|---|---|---|---|
| 2009/0087702 A1* | 4/2009 | Yonekura et al. | 429/13 |
| 2011/0079453 A1* | 4/2011 | Wanger et al. | 180/11 |
| 2011/0087389 A1* | 4/2011 | Burleigh et al. | 701/22 |
| 2011/0125351 A1* | 5/2011 | Bauerle | 701/22 |
| 2011/0273131 A1* | 11/2011 | Yoon et al. | 320/101 |
| 2012/0032637 A1* | 2/2012 | Kotooka et al. | 320/109 |
| 2012/0208672 A1* | 8/2012 | Sujan et al. | 477/5 |
| 2012/0209463 A1* | 8/2012 | Gibbs et al. | 701/22 |
| 2013/0197729 A1* | 8/2013 | Ramaswamy et al. | 701/22 |
| 2013/0245871 A1* | 9/2013 | Shirasaka et al. | 701/22 |
| 2014/0277931 A1* | 9/2014 | Crowe | 701/36 |

FOREIGN PATENT DOCUMENTS

| | | |
|---|---|---|
| JP | 2002-142305 A | 5/2002 |
| JP | 2004-056868 A | 2/2004 |
| JP | 2006-296106 A | 10/2006 |
| JP | 2008-017594 A | 1/2008 |
| JP | 2009-054397 A | 3/2009 |
| JP | 2009-065810 A | 3/2009 |
| JP | 2011-090912 A | 5/2011 |
| KR | 10-2006-0020929 A | 3/2006 |
| KR | 10-2010-0005768 A | 1/2010 |
| KR | 10-2011-0083413 A | 7/2011 |

\* cited by examiner

METHOD OF CONTROLLING OPERATION MODE OF FUEL CELL IN FUEL CELL VEHICLE

CROSS REFERENCE TO RELATED APPLICATION

This application claims under 35 U.S.C. §119(a) the benefit of Korean Patent Application No. 10-2013-0051002, filed on May 7, 2013, the entire contents of which are incorporated herein by reference.

BACKGROUND OF THE INVENTION

1. Field of the Invention

The present invention relates, in general, to a method of controlling an operation mode of a fuel cell during operation of a fuel cell vehicle, particularly when a stop mode of the fuel cell is extended, by taking account of durability (e.g., stack dry-out prevention, open-circuit voltage holding time reduction, etc.) of the fuel cell.

2. Description of the Related Art

Generally, a fuel cell vehicle uses a fuel cell to produce electricity using hydrogen and oxygen, thereby powering its electric motor or charging its battery. Further, the fuel cell vehicle can also implement a regenerative braking system using a power-generation function of the electric motor.

To improve fuel efficiency of a fuel cell vehicle, an idle stop technology has been proposed in which a fuel cell stops generating electricity when the fuel cell vehicle idles. In regard to fuel cells, various methods of determining or performing stop/start of power generation have also been proposed.

However, none of these methods provides a method wherein when a fuel cell vehicle is driving, a stop mode of the fuel cell is extended.

Further, since it takes a certain amount of time for a fuel cell to form a voltage when a fuel cell vehicle is re-accelerated after being stopped, the fuel cell vehicle needs to further include both a restart method so as to improve acceleration performance during re-acceleration, and a method of avoiding frequent stopping and starting of the fuel cell.

The description regarding the related art is provided only for understanding of the background of the invention, so it should not be construed by ordinarily skilled persons in the art to be admitted to the related art.

SUMMARY OF THE INVENTION

Accordingly, the present invention provides a method of controlling an operation mode of a fuel cell when a fuel cell vehicle is driving, particularly by extending a stop mode of the fuel cell, wherein the durability (stack dry-out prevention, open-circuit voltage holding time reduction, etc.) of the fuel cell is taken into account.

According to one aspect the present invention provides a method of controlling an operation mode of a fuel cell in a fuel cell vehicle including: determining a first and second torque and a first and second state of charge (SOC), the first torque and first SOC being the stop mode standard values for torque and SOC, and the second torque and second SOC being the start mode standard values for torque and SOC (the first and second torque and SOC values may be determined in advance, for example, by a controller through data mapping) when a driver-demanded torque is lower than the first torque, and a current state of charge (SOC) in a battery is higher than the first SOC, converting the operation mode of the fuel cell to a stop mode; and when the driver-demanded torque is higher than the second torque, or the current SOC in the battery is lower than the second SOC, converting the operation mode to a start mode, wherein the second torque is higher than the first torque, and the second SOC is lower than the first SOC.

According to various embodiments, during a regenerative braking state of the fuel cell vehicle, as compared to a normal driving state of the fuel cell vehicle, the operation mode is more quickly converted to the stop mode by reducing the first SOC.

According to various embodiments, during a downhill driving state of the fuel cell vehicle, as compared to a state other than the downhill driving state, the operation mode is more quickly converted to the stop mode by increasing the first torque.

According to various embodiments, during at least a portion of an idle state of the fuel cell vehicle, as compared to the non-idle state, the operation mode is more quickly converted to the stop mode by increasing the first torque.

According to various embodiments, during rapid acceleration of the fuel cell vehicle, the operation mode is more quickly converted to the start mode by reducing the second torque.

According to various embodiments, during a decrease in available output voltage of the fuel cell, the operation mode is more quickly converted to the start mode by reducing the second torque.

According to various embodiments, the operation mode may be converted to the start mode when the driver-demanded torque is higher than the second torque, when the current SOC is lower than the second SOC, or when a vehicle speed is equal to or higher than a predetermined speed and a voltage across both poles of the fuel cell is equal to or lower than a predetermined voltage.

According to various embodiments, during the start mode, the conversion of the operation mode to the stop mode is determined after the start mode is maintained for a certain predetermined period of time.

According to various embodiments, when the stop mode is carried out and is not yet terminated, the stop mode may be partially interrupted or interrupted at some point during the stop mode when the driver-demanded torque becomes higher than a third torque or when the current SOC becomes lower than a third SOC, wherein the third torque is a predetermined torque ranging between the first and second torques, and the third SOC is a predetermined SOC ranging between the first and second SOCs.

According to the method of controlling an operation mode of a fuel cell when a fuel cell vehicle is driving, the stop mode of the fuel cell is extended, taking into account durability (stack dry-out prevention, open-circuit voltage holding time reduction, etc.) of the fuel cell.

Further, although it takes a certain amount of time for a fuel cell to form a voltage when a fuel cell vehicle is re-accelerated after being stopped, the present method can improve acceleration performance of the fuel cell vehicle during re-acceleration, and can avoid frequent stopping and starting of the fuel cell, thereby ensuring durability of the fuel cell.

Other aspects and exemplary embodiments of the invention are discussed infra.

BRIEF DESCRIPTION OF THE DRAWINGS

The above and other objects, features and advantages of the present invention will be more clearly understood from the following detailed description when taken in conjunction with the accompanying drawings, in which.

Figure 1:
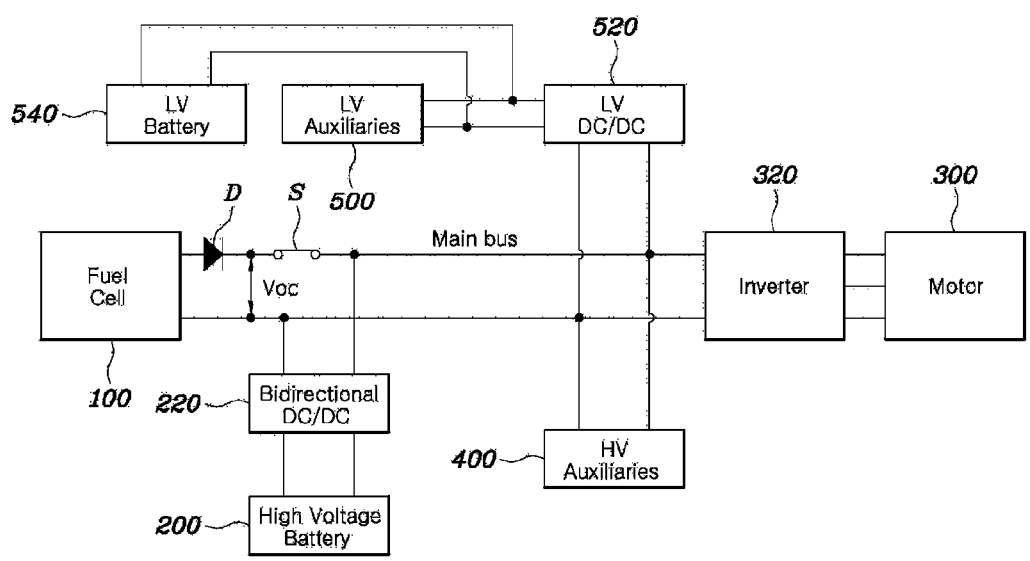
FIG. 1 is a system block diagram for implementing a method of controlling an operation mode of a fuel cell in a fuel cell vehicle according to an embodiment of the present invention.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment. The specific solar cell type of the invention as disclosed herein will be determined in part by the particular intended application and use environment.

In the figures, reference numerals refer to the same or equivalent parts of the disclosure throughout the several figures of the drawings.

DETAILED DESCRIPTION OF THE INVENTION

Reference will now be made in greater detail to a preferred embodiment of the invention, an example of which is illustrated in the accompanying drawings.

While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods and units are executed by at least one processor within at least controller. The term controller refers to a hardware device that includes a memory and a processor. The memory is configured to store the modules/units and the processor is specifically configured to execute said units to perform one or more processes algorithmically. These processes are described further below. Additionally, each of these units may be controlled by the same processor or different processors without diverting from the overall intention of the present invention. Therefore, the processor by which the each unit is executed is irrelevant to overall operation of the present invention.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
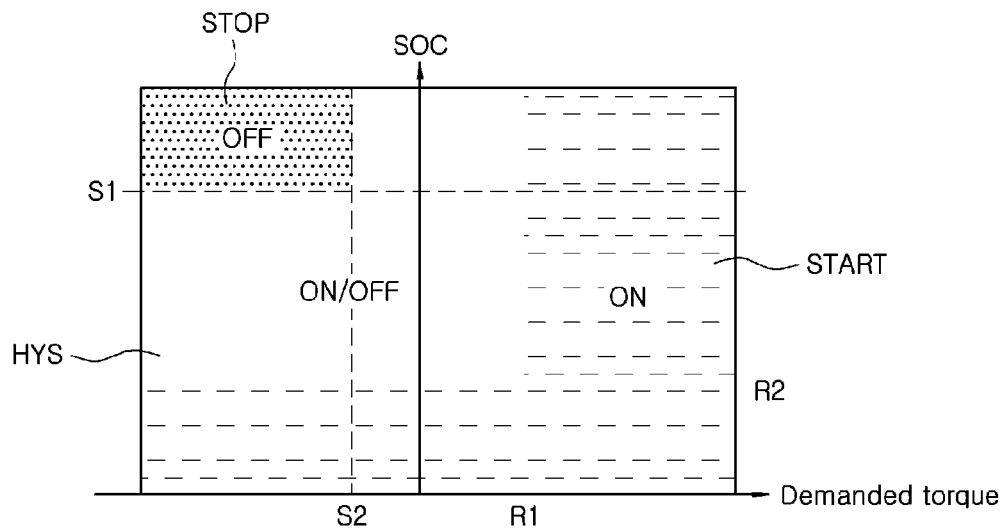
FIGS. 2 to 4 are graphs showing an operation mode of a fuel cell according to a correlation between a first torque and a first SOC and between a second torque and a second SOC according to an embodiment of the present invention.
Figure 3:
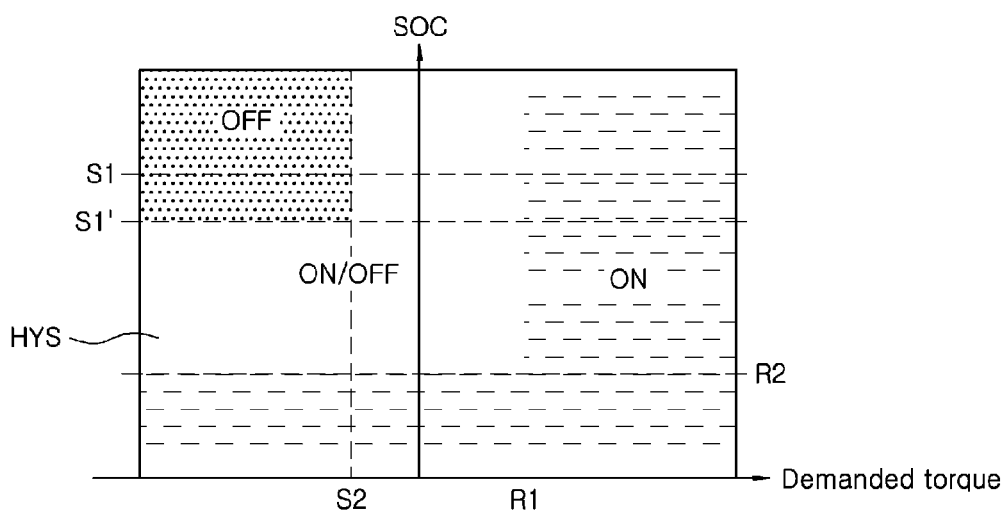
Figure 4:
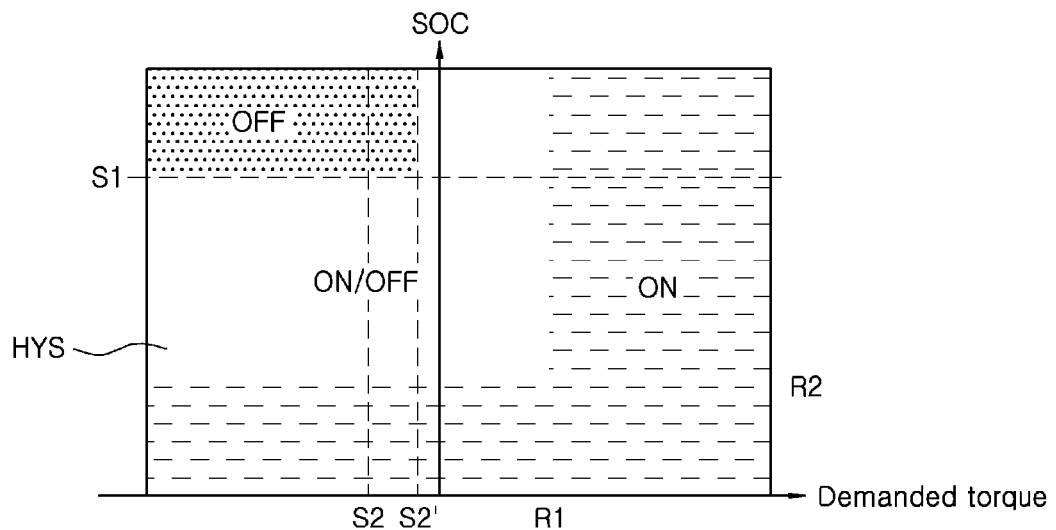
Figure 5:
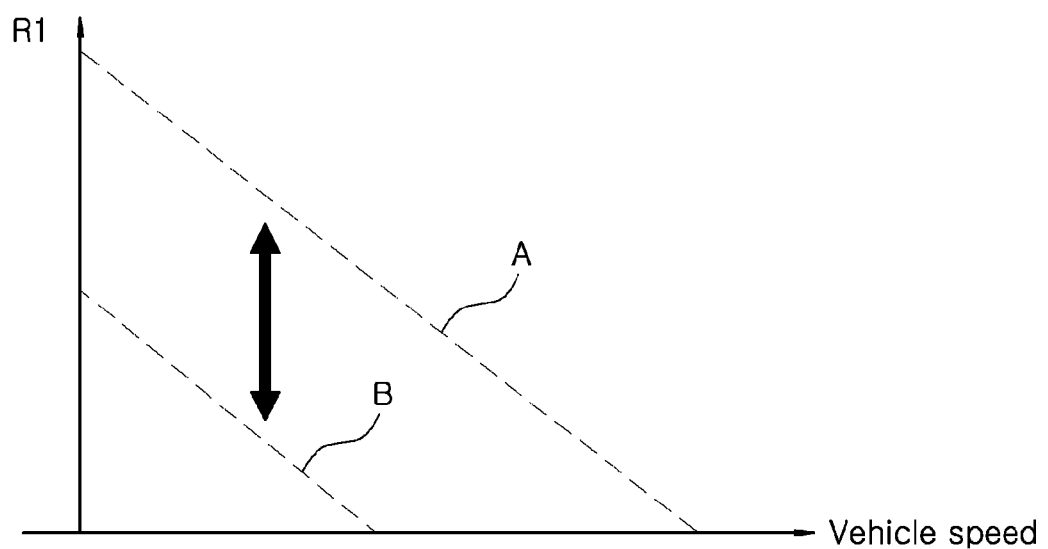
FIG. 5 is a graph showing a correlation between the second torque and a vehicle speed for implementing a method of controlling an operation mode of a fuel cell in a fuel cell vehicle according to an embodiment of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. FIG. 1 is a system block diagram for implementing a method of controlling an operation mode of a fuel cell in a fuel cell vehicle according to an embodiment of the present invention, FIGS. 2 to 4 are graphs showing an operation mode of a fuel cell according to a correlation between a first torque and a first SOC and between a second torque and a second SOC, and FIG. 5 is a graph showing a correlation between the second torque and a vehicle speed for implementing the method.

First, FIG. 1 shows a system block diagram for implementing a method of controlling an operation mode of a fuel cell in a fuel cell vehicle according to an embodiment of the present invention. The fuel cell system generally includes a fuel cell, a battery, and a motor. FIG. 1 shows the entire system power net that is a hybrid system of a fuel cell 100 and a high voltage battery 200 to which the present invention is applied. A bi-directional power (DC/DC) converter 220 that can perform power control on the high voltage battery 200 is provided at a terminal side thereof. A high voltage electronic load 400 and a low voltage battery 540, which do not include a motor 300/an inverter 320, a low voltage electronic load 500, and a low voltage power converter 520 which converts high voltage to low voltage are also provided to the terminal side of the high voltage battery. On a terminal side of the fuel cell 100, a diode D which allows a current to flow only in one direction and a relay S which connects the fuel cell 100 to a terminal of a main bus are included. The relay S is continuously connected to the terminal side of the fuel cell during a start or stop mode of the fuel cell as well as during the driving of the fuel cell vehicle, except in the case of key-off or emergency shutdown.

In an aspect of the present invention, a method of controlling an operation mode of a fuel cell in a fuel cell vehicle includes: determining a first torque (S2), a second torque (R1), a first SOC (S1), and a second SOC (R2), wherein the second torque (R1) is higher than the first torque (S2), and the second SOC (R2) is lower than the first SOC (S1); when a driver-demanded torque is lower than a first torque (S2), and a current state of charge (SOC) in a battery is higher than a first SOC (S1), converting the operation mode of the fuel cell to a stop mode (STOP), and when the driver-demanded torque is higher than a second torque (R1), or the current SOC in the battery is lower than a second SOC (R2), converting the operation mode to a start mode (START).

In particular, the method performs the stop mode of the fuel cell such that the fuel cell does not operate when it is not necessary, thereby improving fuel efficiency and durability of a fuel cell vehicle. Further, the method performs the start mode of the fuel cell so that the fuel cell starts its operation again when it is necessary.

Specifically, in order to perform the stop mode/start mode of the fuel cell, the method determines whether or not the stop mode or the start mode is required, particularly by using the driver-demanded torque and SOC of the high voltage battery.

The driver-demanded torque reflects the driver's intended acceleration of the vehicle, and it can be determined by the press-down force of an accelerator pedal or the like.

When the demanded torque is very low and the SOC is high, there is no need to operate the fuel cell, so the fuel cell enters the stop mode. Then, when the driver-demanded torque increases during the stop mode, it is determined that the driver has the intention to accelerate the vehicle, so the fuel cell enters the start mode.

Further, even when the SOC of the battery becomes lower and the demanded torque is low, there is a need to charge the battery, so the fuel cell enters the start mode.

However, frequent conversion to start/stop mode reduces the durability of the fuel cell and makes it difficult to quickly cope with the demanded torque. As such, the present method provides a certain region of a hysteresis section (HYS) in order to seek a compromise between the durability and the demanded performance of the fuel cell.

Specifically, referring to FIG. 2, when the driver-demanded torque is lower than the first torque (S2) and the current SOC of the battery is higher than the first SOC (S1), the operation mode of the fuel cell is converted to the stop mode (STOP).

Further, when the driver-demanded torque is higher than the second torque (R1), or the current SOC is lower than the second SOC (R2), the operation mode of the fuel cell is converted to the start mode (START).

At the same time, the second torque (R1) is set to a higher value than the first torque (S2), and the second SOC (R2) is set to a lower value than the first SOC (S1), particularly through data mapping. Thus, after the operation mode enters the stop mode, the operation mode does not enter the start mode exactly when passing the parameter value but instead enters the start mode after passing a certain range of the parameter value, thereby improving the durability of the fuel cell.

Further, during a regenerative braking state of the fuel cell vehicle, as compared to a normal driving state of the fuel cell vehicle, the operation mode may be more quickly converted to the stop mode by reducing the first SOC (S1). This is shown in FIG. 3 which illustrates a standard of entering the stop mode of the fuel cell in detail. In the regenerative braking state, the fuel cell is charged with the high voltage battery, so the first SOC (S1) (i.e., the stop-entering standard or stop mode value) is set to a slightly lower value (S1'), thereby allowing the operation mode to enter the stop mode more quickly as compared to a normal driving state of the fuel cell vehicle.

Further, during a downhill driving state of the fuel cell vehicle, as compared to a state other than the downhill driving state, the operation mode may be more quickly converted to the stop mode by increasing the first torque (S2). In addition, during at least a portion of an idle state of the fuel cell vehicle, as compared to the non-idle state, the operation mode may be more quickly converted to the stop mode by increasing the first torque (S2).

FIG. 4 shows this case, in which in order to avoid stack dry-out due to a supply of an idle air flow rate resulting from an extended idling state, the first torque (S2), i.e. the demanded torque standard, is set to a slightly higher value (S2'), thereby allowing the operation mode to more easily enter the stop mode. Also during the downhill driving state, it is highly possible for the vehicle to continuously go through an inertial running state or a braking state, rather than acceleration. As such, the first torque (S2) of the stop-entering standard is set to a slightly higher value to facilitate entering the stop mode.

The above configuration aims at extending the range of entering the stop mode of the fuel cell in terms of fuel efficiency and durability of the fuel cell. Further, standards of entering or leaving the stop mode, i.e. the stop and start mode standards, are separately provided so as to avoid frequent conversion between the stop mode and start mode.

According to various embodiments, during rapid acceleration of the fuel cell vehicle, the operation mode may be more quickly converted to the start mode by reducing the second torque (R1). Also, during a decrease in available output voltage of the fuel cell, the operation mode may be more quickly converted to the start mode by reducing the second torque (R1).

FIG. 5 is a graph showing the operation of the fuel cell according to the change in the parameter values, wherein the second torque (R1), which is a standard value of entering the start mode (i.e., the start standard) is illustrated. The second torque (R1), which is the start standard value varies based on mapping between a vehicle speed and variable output voltage of the high voltage battery as an auxiliary power source (HV auxiliaries). In a case where the vehicle speed is high, when the available output voltage of the battery is reduced due to a reason such as battery temperature, the operation mode is converted to the start mode even at low driver-demanded torque, thereby preventing a power reduction in acceleration output.

In FIG. 5, in which the horizontal axis indicates the vehicle speed and the vertical axis indicates the second torque (R1) as the start standard, a correlation is demonstrated in which as the speed increases, the second torque (R1) decreases. This correlation shows that, when the driver tries to re-accelerate the vehicle during its high-speed driving mode, the fuel cell is quickly operated so as to meet the driver's acceleration intention.

Meanwhile, as illustrated in the graph, there is a downward shift (from A to B) as the available output voltage of the high voltage battery decreases. This is done in order to allow the fuel cell to enter the start mode more quickly as the available output voltage of the battery decreases, by reducing the second torque (R1) accordingly.

Further, the operation mode may be converted to the start mode when the driver-demanded torque is higher than the second torque (R1), when the current SOC is lower than the second SOC (R2), or when the vehicle speed is equal to or higher than a predetermined speed and a voltage applied across both poles of the fuel cell is equal to or lower than a predetermined voltage.

In particular, when the driver-demanded torque is higher than the second torque (R1), the operation mode is converted to the start mode. Further, when the current SOC of the battery is lower than the second SOC (R2), the operation mode is also converted to the start mode.

Further, when the vehicle speed is equal to or higher than a predetermined speed and a voltage applied across both poles of the fuel cell is equal to or lower than a predetermined voltage, the operation mode is also converted to the start mode.

In a case where the vehicle speed is a high speed, when the driver tries to re-accelerate the vehicle, it is preferable that voltage of the fuel cell be leveled up quickly in order to meet the driver's acceleration intention. Thus, when the vehicle speed is high and the voltage of the fuel cell is low, the start standard is set such that the voltage is leveled up to a certain level in advance in order to prepare for re-acceleration.

Further, in order to prevent frequent and repeated conversions between stop/start modes, a current operation mode may be converted to another operation mode only after the current operation mode has been maintained for a predetermined period of time. For example, during the start mode, the operation mode may only be allowed to be converted to the stop mode after the start mode has been is maintained for a certain predetermined time.

Figure 6:
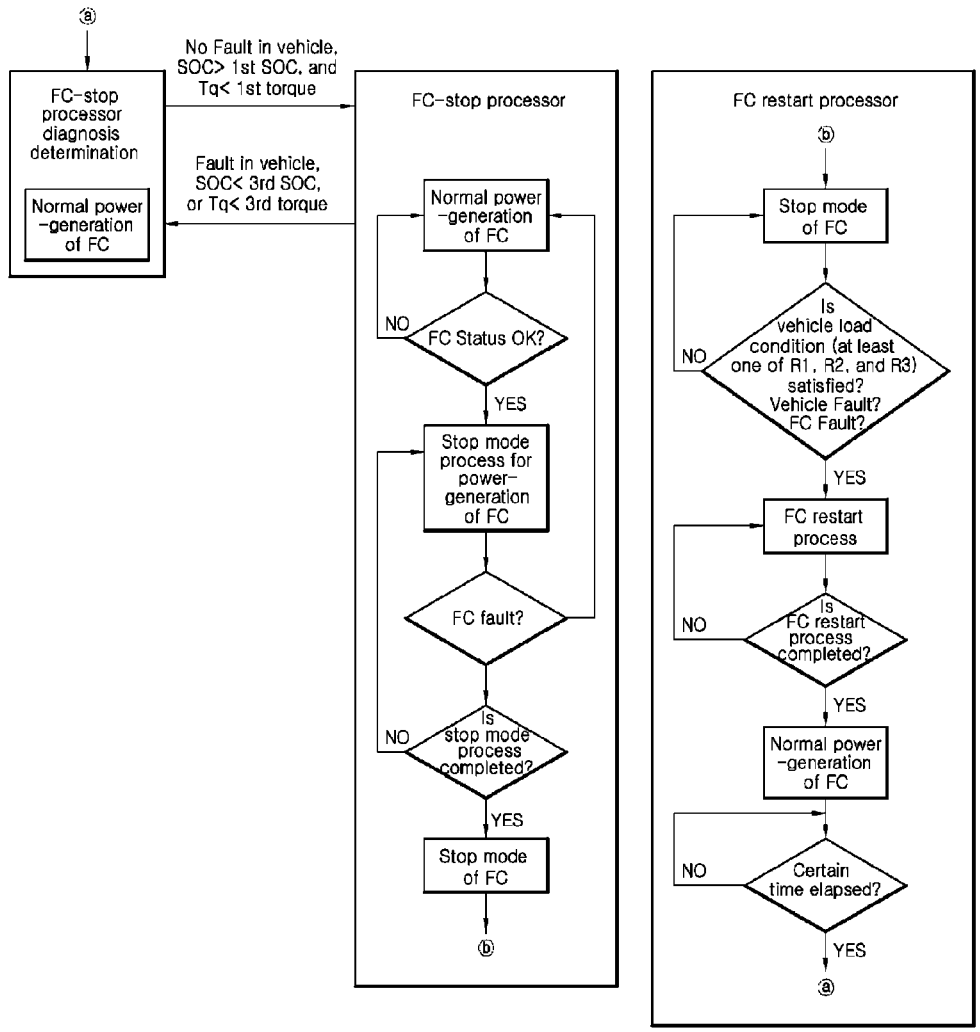
FIG. 6 is a flowchart showing a procedure of the method of controlling the operation mode of the fuel cell in the fuel cell vehicle according to an embodiment of the present invention.

FIG. 6 is a flowchart showing a procedure of the method of controlling the operation mode of the fuel cell in the fuel cell vehicle according to an embodiment of the present invention. First, during a normal power-generation mode, when the demanded torque is lower than the first torque and the current SOC of the battery is higher than the first SOC, the operation mode enters the stop mode. Then, after entering the stop mode, when the driver-demanded torque is higher than the second torque, the SOC of the battery is lower than the second SOC, or the vehicle speed is equal to or higher than a predetermined speed and a voltage applied across both poles of the fuel cell is equal to or lower than a predetermined voltage, the operation mode is converted to the re-start mode. After the re-start mode is conducted, the conversion to the stop mode is determined after a certain time passes.

In the meantime, when the stop mode is carried out and is not yet terminated, the stop mode may be partially interrupted or interrupted at some point during the stop mode (e.g. halfway through or at any other portion) when the driver-demanded torque becomes higher than a third torque or the current SOC becomes lower than a third SOC. In particular, the third torque is a predetermined torque ranging between the first and second torques, and the third SOC is a predetermined SOC ranging between the first and second SOCs. That is, according to this embodiment, during a normal power-generation mode, when the demanded torque is lower than the first torque and the current SOC of the battery is higher than the first SOC, the operation mode enters the stop mode. Then, during the stop mode, the stop mode is interrupted at some point during the stop mode when the driver-demanded torque becomes higher than the third torque or the current SOC becomes lower than the third SOC, particularly wherein after entering the stop mode, when the driver-demanded torque is higher than the second torque, the SOC of the battery is lower than the second SOC, or the vehicle speed is equal to or higher than a predetermined speed and a voltage applied across both poles of the fuel cell is equal to or lower than a predetermined voltage, the operation mode is converted to the re-start mode. Thereby, the operation mode can be controlled to be converted to stop/stop-interruption/re-start mode in a three-step method.

According to the method of controlling an operation mode of a fuel cell when a fuel cell vehicle is driving, the stop mode of the fuel cell can be extended, taking account of durability (stack dry-out prevention, open-circuit voltage holding time reduction, etc.) of the fuel cell.

Further, although it takes a certain amount of time for a fuel cell to form a voltage when a fuel cell vehicle is re-accelerated after being stopped, the present method can improve acceleration performance of the fuel cell vehicle during re-acceleration, and can avoid frequent stopping and starting of the fuel cell, thereby ensuring durability of the fuel cell.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling an operation mode of a fuel cell in a fuel cell vehicle, comprising:
   determining by a controller a first torque and a first state of charge (SOC) corresponding to a stop mode torque value and a stop mode SOC value, and determining by a controller a second torque and a second SOC corresponding to a start mode torque value and a start more SOC value, wherein the second torque is higher than the first torque and the second SOC is lower than the first SOC;
   when a driver-demanded torque is lower than the first torque, and a current SOC in a battery is higher than the first SOC, converting by the controller the operation mode of the fuel cell to a stop mode; and
   when the driver-demanded torque is higher than the second torque, or the current SOC in the battery is lower than the second SOC, converting by the controller the operation mode of the fuel cell to a start mode,
   wherein the first torque is increased to more quickly convert the operation mode to the stop mode or the second torque is reduced to more quickly convert the operation mode to the start mode according to driving state of the fuel cell vehicle.

2. The method according to claim 1, wherein during the stop mode and when the stop mode is not yet terminated, the stop mode is interrupted when the driver-demanded torque becomes higher than a third torque or the current SOC becomes lower than a third SOC, wherein the third torque is a predetermined torque ranging between the first and second torques, and the third SOC is a predetermined SOC ranging between the first and second SOCs.

3. The method of claim 1 wherein the first torque is increased to more quickly convert the operation mode to the stop mode.

4. The method of claim 1 wherein the second torque is reduced to more quickly convert the operation mode to the start mode according to driving state of the fuel cell vehicle.

5. The method according to claim 1, wherein as speed of the fuel cell vehicle is increased, the second torque is reduced to more quickly convert the operation mode to the start mode.

6. The method according to claim 1, wherein as available output voltage of the fuel cell is decreased, the second torque is reduced to more quickly convert the operation mode to the start mode.

7. The method according to claim 1, wherein the operation mode is converted to the start mode when the driver-demanded torque is higher than the second torque, when the current SOC is lower than the second SOC, or when a vehicle speed is equal to or higher than a predetermined speed and a voltage across both poles of the fuel cell is equal to or lower than a predetermined voltage.

8. The method according to claim 1, wherein during the start mode, the operation mode is not converted to the stop mode until the start mode has been maintained for at least a predetermined period of time.

9. A non-transitory computer readable medium containing program instructions executed by a controller, the computer readable medium comprising:
- program instructions that determining a first torque, a first state of charge (SOC), a second torque and a second SOC of a fuel cell in a fuel cell vehicle;
- program instructions that compare a driver-demanded torque to the first torque and that compare a current SOC to the first SOC;
- program instructions that convert an operation mode of the fuel cell to a stop mode when the driver-demanded torque is lower than the first torque, and when the current SOC is higher than the first SOC;
- program instructions that compare a driver-demanded torque to the second torque and a current SOC to the second SOC;
- program instructions that convert the operation mode of the fuel cell to a start mode when the driver-demanded torque is higher than the second torque, and when the current SOC is lower than the second SOC; and
- program instructions that determine when the fuel cell vehicle is in a regenerative braking state, a downhill driving state, an idle state, a rapid acceleration state, or a state of decrease in available output voltage;
- program instructions that reduce the first SOC when the fuel cell is in the regenerative braking state;
- program instructions that increase the first torque when the fuel cell is in the downhill driving state;
- program instructions that increase the first torque when the fuel cell is in at least a portion of the idle state;
- program instructions that reduce the second torque as speed of the fuel cell is increased; and
- program instructions that reduce the second torque as available output voltage of the fuel cell is decreased.

* * * * *